July 29, 1958 J. CHRISTOFFERSON 2,845,098
STEM PROCESSING MACHINE

Filed Dec. 19, 1952 3 Sheets-Sheet 1

INVENTOR.
James Christofferson
BY
attorney

July 29, 1958  J. CHRISTOFFERSON  2,845,098
STEM PROCESSING MACHINE

Filed Dec. 19, 1952  3 Sheets-Sheet 2

INVENTOR.
James Christofferson
BY
attorney

July 29, 1958     J. CHRISTOFFERSON     2,845,098
STEM PROCESSING MACHINE

Filed Dec. 19, 1952     3 Sheets-Sheet 3

*INVENTOR.*
James Christofferson
BY
attorney

United States Patent Office 2,845,098
Patented July 29, 1958

2,845,098

STEM PROCESSING MACHINE

James Christofferson, West Newbury, Mass., assignor to Columbia Broadcasting System, Inc., Danvers, Mass., a corporation of New York Application December 19, 1952, Serial No. 326,811

3 Claims. (Cl. 140—71.5)

This invention relates in general to the manufacture of electron tubes and in particular to machinery for processing electron tube stems.

Preliminary assembly of electron tubes follows fairly well known techniques. Basic glass work is done first and simultaneously materials are processed and formed into tube elements. The elements are assembled and welded in place on a "stem" at "mount" department. From the mount department, assemblies are taken to be enclosed, evacuated, and finally sealed off, usually by tipping a glass tube which communicates with the interior of the tube. Because of the nature of the work, the assembly of elements onto the stem, or mounting, requires the greatest amount of hand work of any of the tube making operations. Persistent efforts have been made to reduce the amount of hand work in this area, and some success has been had. The stem, which constitutes the bottom of the tube envelope, through which pass the leads to be welded to tube elements, is usually preliminarily prepared to receive the elements in several ways. The leads are cut to various lengths and bent into various positions to best accommodate the tube elements to be welded thereto. Cutting and bending operations have been effected by hand tools and by semi-automatic tools in the past. Automatic machines have been used for some of these functions, but are objectionable for several reasons.

One such machine, designed along traditional tube making lines with a large horizontal indexing turret having spaced heads on its lower surface has been developed. It has not received general acceptance in the industry, however, for several reasons. First, it is quite large because the need of arraying a group of tools and actuators adjacent each head results in large spacing between heads and a correspondingly large machine. Second, it is a costly device because of its general complexity especially in the mechanical driving members at each of the head positions. Third, the machine because of its layout is difficult to load and unload, so much so that loading turrets are required in most instances, thereby adding further to cost and complexity. Fourth, proper adjustment and maintenance of the machine is difficult and time-consuming, particularly when tube types are changed. This, of course, cuts into the value of the machine in terms of efficiency of operation.

Therefore, it is an object of the present invention to provide a simple, rugged, reliable machine for preparing stems for mounting.

It is a further object to provide an inexpensive, easily maintained machine for cutting and bending of stem leads.

It is a still further object to provide a compact unit for automatic stem preparation which is easily loaded and unloaded.

It is another object to provide a flexible machine for preparing stems for mounting which is quickly adaptable to any tube type.

It is still another object to provide a machine for cutting and bending stem leads to proper lengths and shapes.

In general, the present invention consists in a turret arranged to rotate in a vertical plane and having peripheral heads to accommodate radially inserted stems. Stationary plates concentric with the turret carry various lead bending fingers and other operating tools. The first operation is the cutting of the leads to proper length by a reciprocating tool. Then, as the turret indexes, each lead is bent in a predetermined shape by the bending fingers on the stationary plate. The fingers are all simultaneously actuated and the heads are rotated permitting a different lead to be bent at each position of the turret. For a better understanding of the invention, together with other and further objects, features, and advantages, reference should be made to the following description which is to be read in connection with the accompanying drawings in which:

Figure 1:
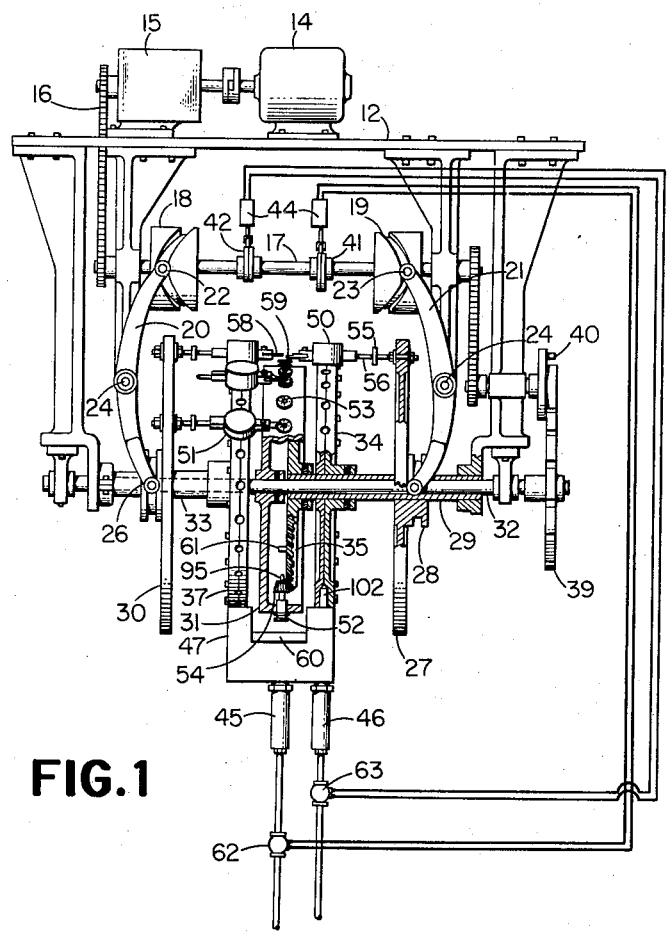
Fig. 1 is a perspective view showing the important elements of the entire device, partially cut away to reveal various features.

Referring particularly to Fig. 1, there is shown in part a framework 12 on which the entire unit is mounted. Mounted on the framework 12 at the upper rear, is a main drive motor 14 and a speed reduction unit 15 coupled to motor 14. From reduction unit 15, a drive 16 is connected to a cam shaft 17. Mounted on cam shaft 17 are similar barrel cams 18 and 19. Barrel cams 18 and 19 have cam followers 22 and 23 attached thereto, each of these arms being pivoted as at 24. As the cam rotates, barrel cams 18 and 19 are so grooved as to cause a periodic outwardly motion of cam followers 22 and 23 and motion of the pivot arms one toward the other at their front ends. The forward ends of pivot arms 20 and 21 are formed into yokes as at 26. These yokes and their associated mechanisms are entirely similar and, for the purpose of easier explanation, only the apparatus associated with one of the yokes 26 will be explained in detail. Drive plate 27 is attached to grooved hub 28 which is engaged by yoke 26. During the motion of pivot arm 21, drive plate 27 and hub 28 slide on a first stationary sleeve 29. A second drive plate 30 simultaneously has a similar motion on a secondary stationary sleeeve 33. Turret 31 is mounted on a rotatable shaft 32 which passes concentrically of and within stationary sleeve 29 and second stationary sleeve 33. A stationary plate 34 and a stationary master gear 35 are also mounted on sleeve 29 and a second stationary plate 37 is mounted on second stationary sleeve 33.

Rotary shaft 32 which is connected to turret 31, as noted above, also has fixed thereto a Geneva drive 39. Geneva drive 39 has a cooperating actuator 40 which receives power from a belt connected back to cam shaft 17. There are also mounted on cam shaft 17, cams 41 and 42. Separate microswitches 44 are actuated periodically by cams 41 and 42. Each of these switches is connected to energize a solenoid valve which, in turn, controls the flow of air to an air cylinder. The switch operated by cam 41 cooperates with air cylinder 45 and the other cooperates with air cylinder 46. The two air cylinders operate a die and cutting blades carried in a structure 47 in a manner described in detail hereinbelow.

Stationary plates 34 and 37 have mounted about their peripheries, a plurality of finger guide drums as at 50 and 51. These drums have supporting shafts which are inserted in, and angularly and radially adjustable on, plates 34 and 37. Radially mounted on the periphery of turret 31 are a plurality of heads as at 52 and 53. Each of these heads extends into turret 31 and has a gear as at 54 which is engaged by master gear 35. Drive plates 27 and 30 each carry a plurality of finger drives, as at 55, which contact plungers in the same manner that finger drive 55 as illustrated contacts plunger 56 of guide drum 50. To permit better understanding of the invention, several of the heads, drums and drive disks have been removed or cut away.

In operation, tube stems are placed in the heads, and turret 31 is caused to index carrying the heads downwardly as seen in this view. This indexing is caused by the movement of Geneva actuator 40 in conjunction with Geneva drive 39. The rotatable shaft 32 is attached to turret 31, such that turret 31 is periodically moved. During rest periods of shaft 32, rotation of cam shaft 17 continues. The rotation of barrel cams 18 and 19 because of the grooves cut therein causes a closing motion of the front or yoke ends of pivot arms 20 and 21. This action brings drive plates 27 and 30 together causing finger drive disks as at 55, to contact plungers as at 56. Bending tools or fingers as at 58 and 59 move together, one of the fingers first bearing against a lead of an inserted stem and the other then bending that lead over the opposing finger. In each of the positions of the rotating turret 31, a different lead is bent into a position determined by the setting of the drive disks and of the bending fingers.

Actually, the first action of the machine on the downward index of the heads ensues at cutting structure 47 where member 60 moves radially inward over the stem in position adjacent thereto. Then, as explained in greater detail hereinbelow, the various leads of the stem are cut to the proper length. Following the cutting operation, various bending functions are performed at each position beneath and behind the turret as seen, different leads being presented to the bending fingers at each position. This is accomplished by the gear connection between the heads and stationary master gear 35, the movement of turret 31 causing a rotation of all the heads at each indexing of the turret. When the heads reach positions an ejector which constitutes a spring loaded central plunger 95 running through the head is actuated by a protrusion 61 on master gear 35 pushing the stem into a position for easy removal from the head.

Figure 2:
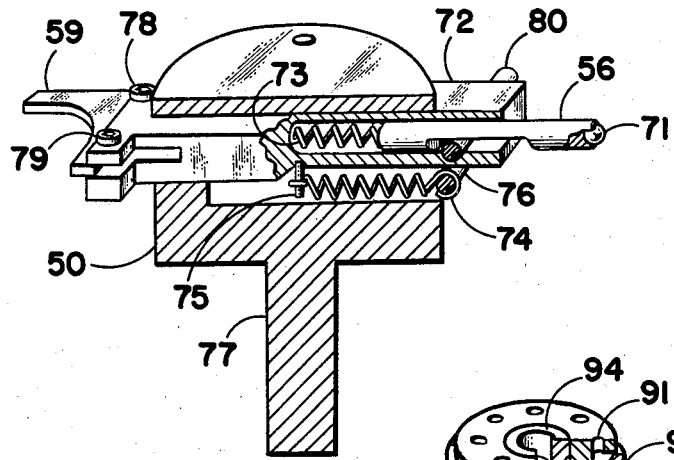
Fig. 2 is a perspective view, partly in section, of one of the tool holders and associated elements.

Referring now to Fig. 2, there is shown a detailed view of finger guide drum 50. This drum is similar in all respects to the other drums used. As noted in the discussion of Fig. 1, drive plate 27 moves toward turret 34 causing drive disk 55 to contact plunger 56, ultimately moving bending finger 59 into contact with a stem lead.

Finger guide drum 50 includes a ball contact 71 which is peened into the end of overtravel plunger 56. Overtravel plunger 56 is inserted in a main plunger 72 and is biased outwardly therefrom by a compression spring 73 bearing from the bottom of a socket in main plunger 72 to the inner end of overtravel plunger 56. Main plunger 72 is also biased outwardly, (to the right as shown) by means of a tension spring 74 stretched from a pin 75 inserted in the underside of main plunger 72 to a free pin 76 which bears against a groove in the outer surface of finger guide drum 50.

At the other end of main plunger 72 (to the left, as shown) provision is made to accommodate bending finger 59. The main plunger 72 is slotted for a distance to form a clamp, screws 78 and 79 being threaded in the lower half of the fork and turning freely in the upper half. A shaft 77 is welded or otherwise firmly attached to drum 50 centrally of its lower surface. Shaft 77 is designed for insertion and clamping in stationary plate 27 as may be more easily seen in Fig. 1.

In operation, after a pair of opposing finger guide drums 50 has been affixed in stationary plate 27, 30 and the finger 59 suitably adjusted, finger drive 55 contacts ball contact 71 and forces main plunger 72 to move toward the stem. The compression spring 73 is sufficiently resilient that overtravel plunger 56 does not at first move relative to main plunger 72. The tension spring 74 exerts sufficiently less resistance than spring 73 to permit main plunger 72 to be the initially moving part. When, however, pin 75 encounters the step at the lower left of drum 50, overtravel plunger 56 commences to move inwardly against spring 73. The travel of overtravel plunger 56 will be limited by the end of the slot in its undersurface contacting pin 80, although in normal circumstances, the travel is never of such great extent. The other end of the slot, of course, acts to prevent overtravel plunger 56 from being forced out of its socket in main plunger 72 by spring 73.

The purpose of overtravel plungers such as 56 is to allow bending fingers 59 either side to act as anvils over which the leads are bent or as tools to do the actual bending. A finger acting as an anvil is stopped by its main plunger being arrested in its travel as the lead is contacted, further motion of the finger drive being taken up by the overtravel plunger. A finger acting as bending tool strikes the lead at a higher point and bends the lead over the anvil without substantial movement of the overtravel plunger in its socket.

Figure 3:
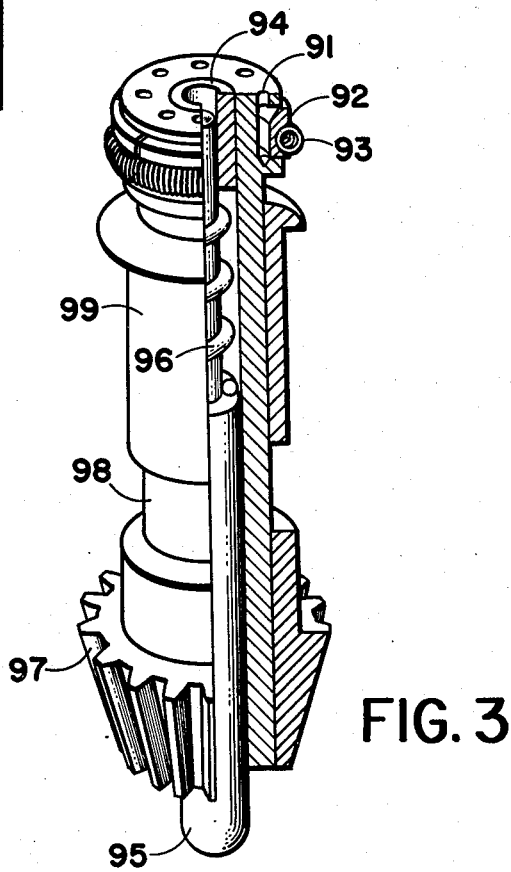
Fig. 3 is a perspective view, also partly in section, of one of the stem-holding heads of the machine.

Referring now to Fig. 3, a typical head such as shown at 52 and 53 in Fig. 1 is illustrated in detail. At the top, there may be seen the various holes for receiving the contact pins of the stem. A central hole 91 is bored down through the head. The periphery of the head is turned down for a portion of its length to cut laterally into hole 91 and the other lead holes of the head. In the turned down portion, a collar 92 is inserted. Collar 92 is formed of a ring which is segmented into three parts. The collar has a concave outer surface which accommodates a coiled spring 93 which passes about the entire periphery. Although the core of the head is drilled out for its entire length, a reducing plug 94 is pressed into the upper end flush with the top of the head. An ejector rod 95 is slide fitted into the central opening of the head, and has a portion thereof of reduced diameter to slide fit into reducing plug 94. A spring 96 is coiled about part of the portion of reduced diameter of ejector rod 95 and depresses it by reason of its being compressed between reducing plug 94 and the full diameter portion of rod 95. A conical gear 97 is pinned to the lower portion 98 of the head, which in turn, is fitted to a bushing 99. Bushing 99 fits one of the radial openings of turret 31 as may be seen in Fig. 1. Conical gear 97 meshes with master gear 35 also as is visible in Fig. 1.

In operation, the head receives the pins of a button stem, the stem being oriented in the head in the same manner as in a conventional tube socket by the arrangement of the receiving holes. Collar 92, being split, is forced inwardly by the action of spring 96 and thus bears upon the lateral pin surfaces of the inserted stems, holding the stems in place. As the turret 31 indexes, the heads are rotated by master gear 35 as mentioned hereinabove. After the stems have been completely processed, protrusion 61 on master gear 35 forces ejector rod 95 upwardly against the pressure of spring 96 and the stem carried by the head is unseated sufficiently so that it may be easily removed from the head.

Figure 4:
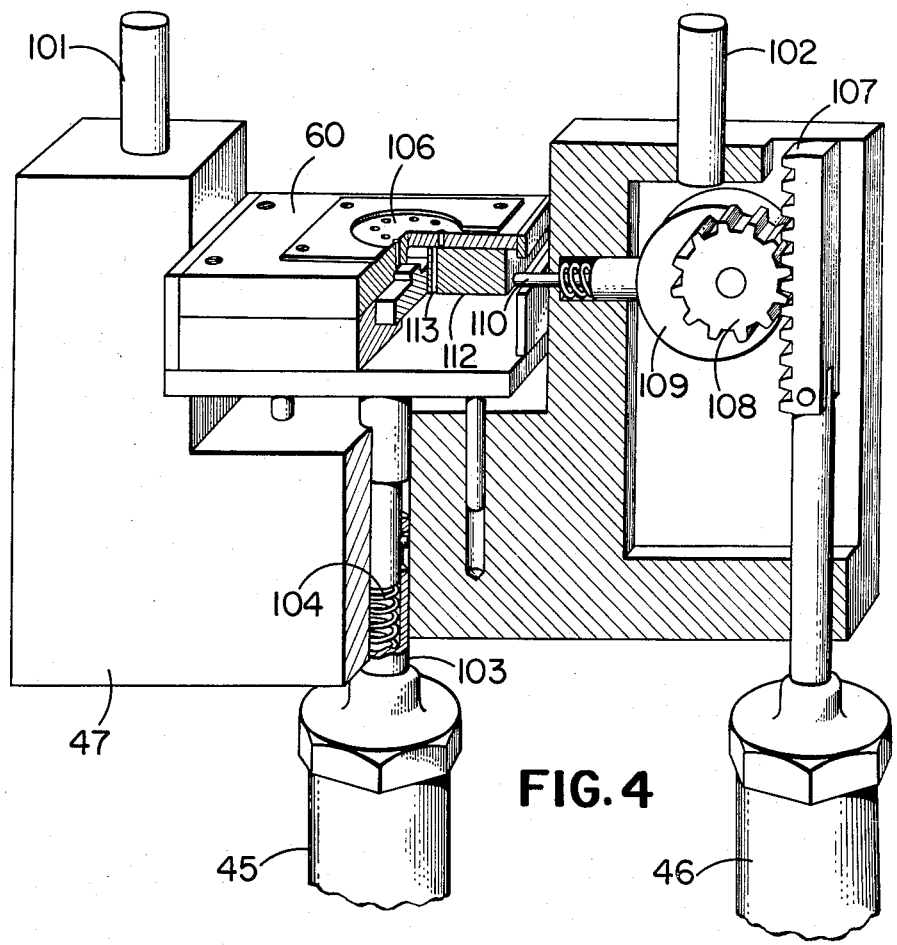
Fig. 4 is a perspective view, partly cut away and partly in section, of the mechanism for cutting stem leads.

Referring particularly to Fig. 4, there is shown in some detail the device for cutting the various stem leads to the proper length. Cutter body 47, as may be seen by further reference to Fig. 1 is attached to stationary plates 37 and 34 by two projections 101 and 102, respectively. Projections 101 and 102 are clamped into the stationary plates in the same manner as the projection 77 of finger guide drum 50. The detail of the cutter can best be explained by describing its sequence of operation. When turret 31 indexes a given head and stem into position adjacent cutter 47, cam 41, which has a long grooved portion as shown, permits the lever of a switch 44 to be depressed for the length of that groove. The switch when so depressed actuates a solenoid valve 62 which allows air under pressure to enter air cylinder 45. A shaft 103 is forced upwardly by cylinder 45. Shaft 103 bears against a spring 104 which, in turn, is affixed to die 60 and die 60 carries a plate 106 which fits over all of the stem leads extending outwardly from the adjacent machine head when it is actuated. The long grooved portion of cam 41 causes the switch associated therewith to remain depressed for a period of time almost as long as the rest time of turret 31.

The second cam 42 has a very short groove cut in its periphery. Switch 44 is depressed only momentarily, energizes a solenoid valve 63 and causes air cylinder 46 to receive air from a pressure line. The shaft of cylinder 46 is attached directly to a rack 107 which meshes with a pinion gear 108. The shaft which carries pinion 108 also carries an eccentric member 109. A shaft 110 bears against member 109 and is spring loaded to assure such contact. A cutter bar 112 is provided and is designed to slide to the left as shown. The synchronization of the cutter bar and eccentric 109 is such that shaft 110 is forced outwardly only when the cutter bar 112 is adjacent thereto as shown.

Thus, when plate 106 is actuated, the stem leads of an adjacent head enter the holes shown in plate 106. Cutter bar 112 is partially cut away to show the various steps which match channels in plate 106, and each step has a hole formed in its upper surface, as at 113, the holes in the various stepped portions matching those of plate 106 when cutter bar 112 is not actuated. Upon actuation, each of the leads is sheared off at the bordering surface of plate 106 and cutter bar 112 by the movement of cutter bar 112.

The clamping arrangement, best seen in Fig. 2, permits a wide range of finger adjustment. The fingers are offset and may be moved in any direction in the plane of the clamping surfaces. Too, the shaft 77 of the finger drum 50 is movable radially in stationary plate 34 as well as being rotatable to any desired position. To accommodate such changes, finger drive 55 is also adjustably mounted. Because of the arcuate opening in which the screw of the finger drive is mounted, it is movable along a circular path. The length of screw thread provided allows for considerable adjustment in spacing between the finger drive and the ball of plunger 56. Sufficient adjustment is provided for these elements to permit any drum unit to be set up to act as either bending finger or anvil for any lead.

The plate 106 (see Fig. 4) is also removable as is the cutter bar 112. Substitute plates and bars having different channels and steps may be inserted to provide different lead lengths.

While what has been shown constitutes a preferred embodiment of the invention, it should not be limited by the details shown but only by the spirit and scope of the appended claims.

What is claimed is:

1. Apparatus for bending leads in electron tube button stems comprising, a supporting framework, a motor and reduction gear mounted on said framework, a cam shaft mounted on said framework and driven by said reduction gear, a main shaft mounted on said framework, a Geneva gear affixed to said main shaft to impart periodic motion thereto, a Geneva actuator for driving said Geneva gear, said Geneva actuator being driven by said cam shaft, a turret having a plurality of radially extending heads spaced about its periphery, said heads being adapted to receive said button stems, said turret being affixed to said main shaft and being rotatable therewith, a first stationary sleeve enclosing a first end portion of said main shaft, a first stationary plate mounted on said first stationary sleeve, a stationary master gear also mounted on said first stationary sleeve, a second stationary sleeve enclosing a second end portion of said main shaft, said turret being affixed to said main shaft at a central point between said first and second stationary sleeves, first and second bushings mounted on said first and second sleeves at points substantially equidistant, from said turret, first and second drive plates mounted on said first and second bushings and axially movable thereon, first and second barrel cams mounted adjacent the extremities of said cam shaft, first and second arms pivotally mounted on said framework between said cam shaft and said main shaft, first and second cam followers affixed to said first arms at the ends adjacent said barrel cams, said barrel cams being grooved to carry said cam followers through periodic movements axially of said cam shaft during rotation thereof, the other ends of said first and second pivot arms being affixed to said first and second drive plates, each of said turret heads having a gear fixed thereto and meshing with said stationary master gear to provide rotation of said heads through a predetermined angle at each rotary movement of said turret, a plurality of bending tools clamped in opposing relationship about the periphery of said first and second stationary plates, said bending tools being arranged in pairs at rest positions of said turret as determined by the movement of said Geneva gear, a plurality of drive disks adjustably affixed adjacent the peripheries of said first and second drive plates, said drive disks being arranged to contact said bending tools, rotation of said barrel cam and said Geneva gear being synchronized such that at each rest period of said turret said drive plates move inwardly toward each other to actuate said bending tools and outwardly during rotational movement of said turret, said heads being rotated at each rotational movement of said turret to present a different lead of said button stems to said bending tools at each rest position of said turret.

2. Apparatus as in claim 1 including, cutting apparatus clamped to said first and second stationary plates adjacent one of said rest positions of said periodically rotating turret, said apparatus comprising, a socket plate having formed therein a plurality of holes for receiving leads of said button stem, said socket having a series of channels formed in the side thereof remote from said button stem, each of said channels intersecting one of said holes, a cutter bar having steps formed in one surface thereof, said steps conforming to said channels and being slidable relative thereto, a similar plurality of holes also being formed in said steps, said holes being aligned with said holes in said socket plate in the normal position of said cutter bar, means for moving said socket plate and cutter bar toward a stem adjacent thereto in synchronism with rest periods of said turret, and means for moving said cutter bar relative to said socket plate to shear off said leads at the junction of said channels and said steps.

3. Apparatus for bending leads in electron tube stems comprising a turret, a first drive shaft, said turret being affixed to said drive shaft, a plurality of heads for receiving said stems, said heads being spaced about the periphery of said turret and extending radially therefrom, a gear fixed to each of said heads, a stationary gear concentric with said turret and meshing with each of said gears fixed to said heads, the hub of said stationary gear being disposed concentrically of said first drive shaft, first and second tool supports disposed adjacent to and on opposite sides of said turret, both said tool supports being slidably disposed around said first drive shaft, the curvature of the periphery of said first and said second tool support being substantially the same as the curvature of said turret, a first and a second plurality of bending tools being affixed the periphery of said first and said second tool support, respectively, at predetermined points thereon whereby each one of said first plurality of tools is disposed oppositely of a separate one of said second plurality of bending tools, a second drive shaft, means continuously rotating said second drive shaft, and means coacting between said first drive shaft and said second drive shaft and said first and said second tool support simultaneously to index periodically said first drive shaft and to convert the rotational movement of said second drive shaft to reciprocating linear motion of said first and said second tool support toward each other and adjacent said heads.

References Cited in the file of this patent

UNITED STATES PATENTS

| | | |
|---|---|---|
| 1,805,124 | Wilcox | May 12, 1931 |
| 1,821,894 | Otaka | Sept. 1, 1931 |
| 1,901,087 | Dalheimer | Mar. 14, 1933 |
| 1,918,538 | Hallenbeck | July 18, 1933 |
| 1,920,108 | Rossmann | July 25, 1933 |
| 2,069,386 | Palucki | Feb. 2, 1937 |
| 2,271,848 | Tcimpidis | Feb. 3, 1942 |
| 2,297,950 | Flaws | Oct. 6, 1942 |
| 2,575,771 | Russell | Nov. 20, 1951 |
| 2,707,848 | Pityo | May 10, 1955 |